Dec. 29, 1931. M. H. HANSEN 1,838,993
COIN CONTROLLED WEIGHING SCALE
Filed Oct. 18, 1930 2 Sheets-Sheet 1
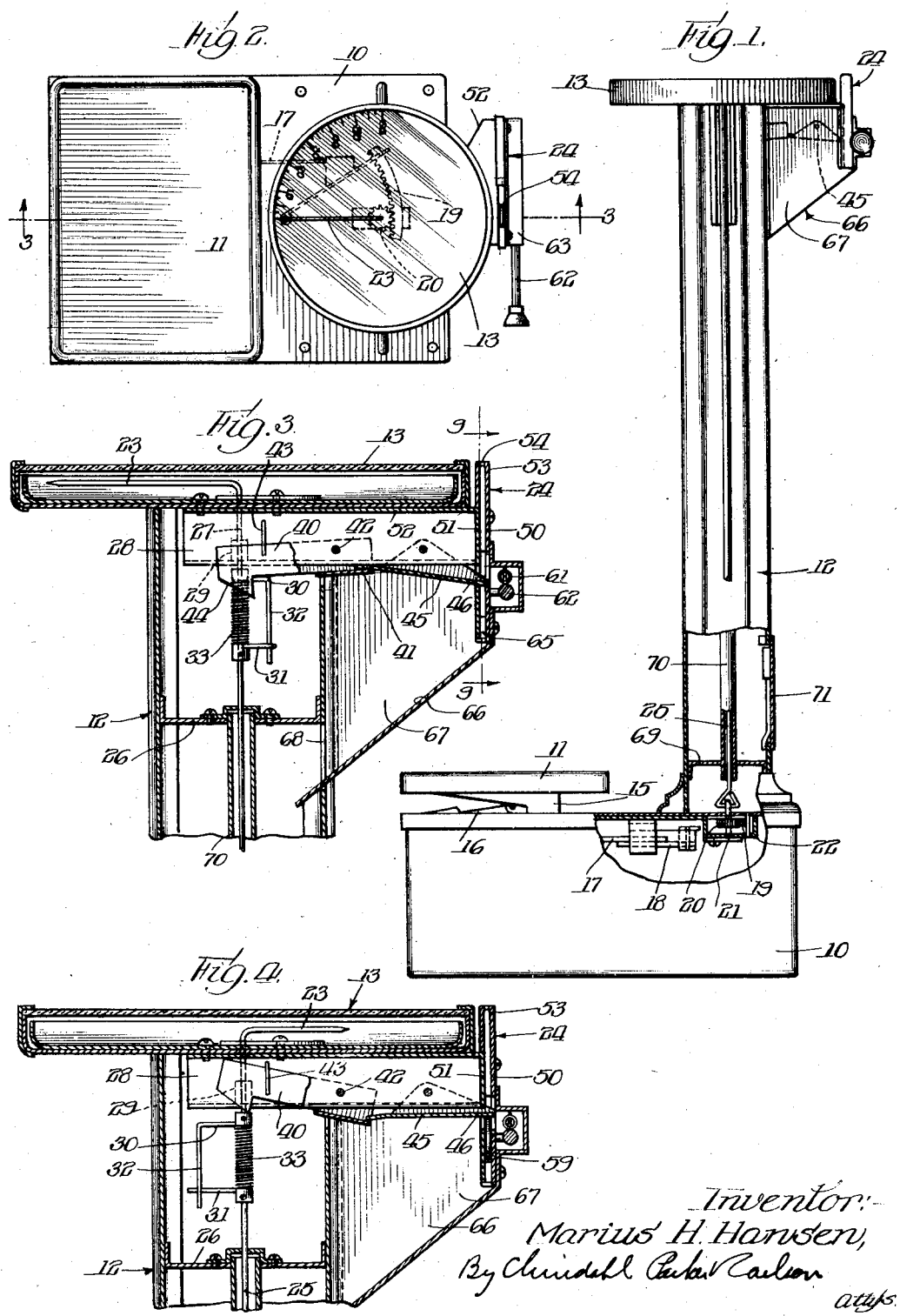

Dec. 29, 1931.  M. H. HANSEN  1,838,993
COIN CONTROLLED WEIGHING SCALE
Filed Oct. 18, 1930  2 Sheets-Sheet 2
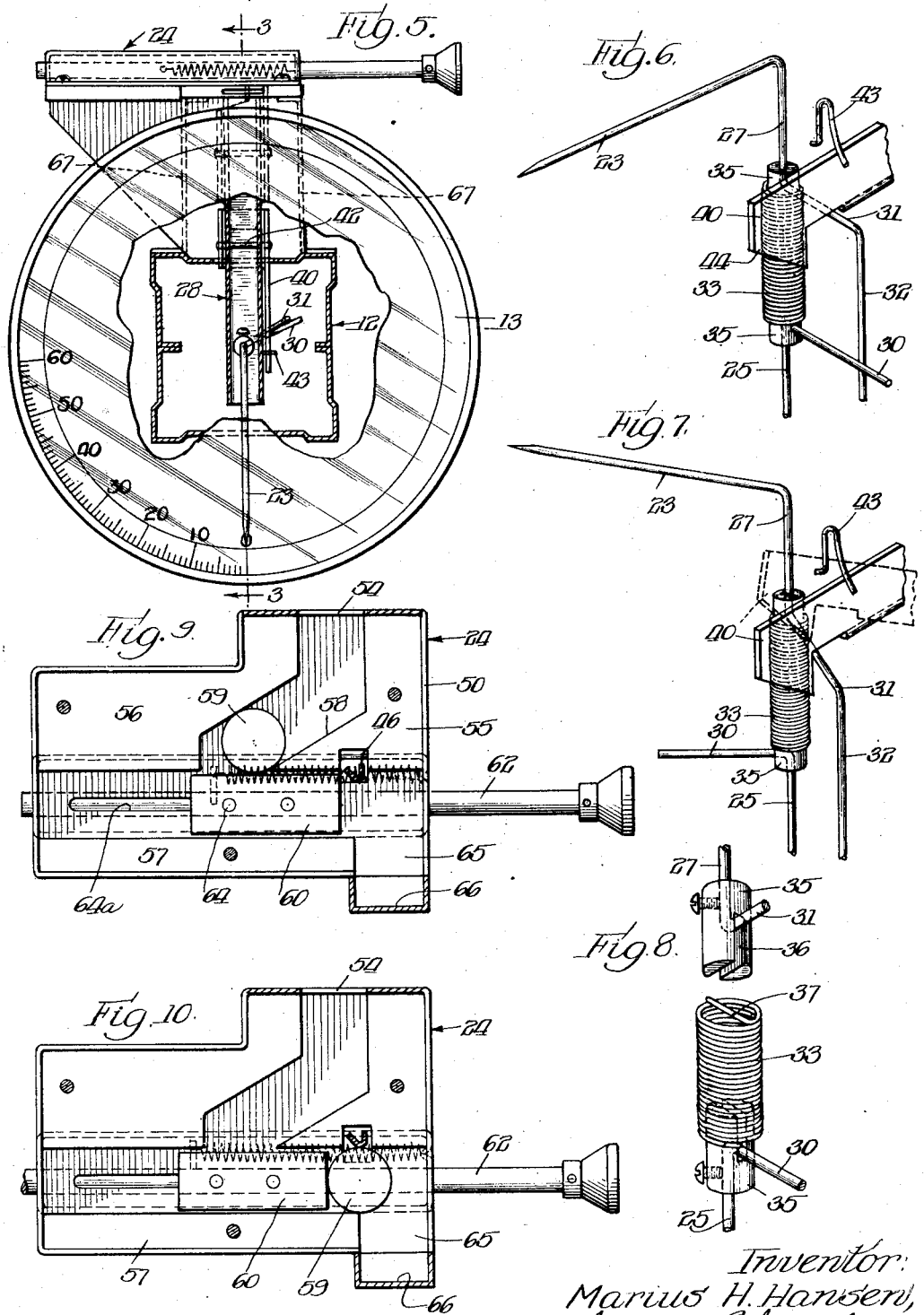
Inventor:
Marius H. Hansen,
By Chindahl Parker Carlson
attys Patented Dec. 29, 1931

1,838,993

UNITED STATES PATENT OFFICE

MARIUS H. HANSEN, OF CHICAGO, ILLINOIS, ASSIGNOR TO HANSON SCALE COMPANY, OF CHICAGO, ILLINOIS, A CORPORATION OF ILLINOIS

COIN CONTROLLED WEIGHING SCALE

Application filed October 18, 1930. Serial No. 489,506.

The invention relates generally to coin-controlled weighing scales and the primary object of the invention is to provide a new and improved scale of this character which is simple and economical in construction and durable and accurate in operation.

Another object is to provide such a scale in which the moving parts are of minimum size and weight whereby to reduce friction and increase the accuracy of the scale.

Another object is to provide such a scale having a simple and efficient form of operating connection between the weighing mechanism and the indicator adapted particularly for scales which have horizontal dials.

Another object is to provide a new and improved coin-operated control device for such scales.

Another object is to provide a coin-operated scale-control device adapted to have the principal parts thereof made from sheet metal by stamping operations.

Other objects and advantages will become apparent from the following description taken in connection with the accompanying drawings, in which:

Figure 1 is a side elevational view of a scale embodying the invention in its preferred form, a portion of the scale being in section to show the construction of the operating parts.

Fig. 2 is a plan view of the scale shown in Fig. 1.

Fig. 3 is an enlarged fragmental section taken substantially along the line 3—3 of Figs. 2 and 5, and showing the parts of the device in their normal or inoperative positions.

Fig. 4 is a view similar to Fig. 3 showing the parts of the indicating mechanism in their released positions.

Fig. 5 is an enlarged plan view of the dial and the coin-control device, a part of the dial being broken away to show the interior construction.

Fig. 6 is a fragmental perspective view of a portion of the indicating mechanism with the parts in their normal or inoperative positions.

Fig. 7 is a view similar to Fig. 6 showing the parts after operation of the weighing mechanism and before operation of the coin-control device.

Fig. 8 is a perspective view similar to Figs. 6 and 7 with the parts separated to show the particular form thereof.

Figs. 9 and 10 are sectional views taken along the line 9—9 of Fig. 3, and showing the coin-operated control device with its parts in two different positions.

While my invention is susceptible of embodiment in many different forms, I have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

Generally considered, the embodiment of the invention herein disclosed comprises a platform-operated weighing mechanism contained within a base having a column upstanding therefrom and supporting a horizontal dial at its upper end. A rod or wire operatively connected to the weighing mechanism and extending upwardly through the column, serves through a one-way positive connection to a coaxial rod to rotate a pointer carried by the second mentioned rod to a zero position on the dial when the weighing mechanism is in normal position. To move the upper wire and its pointer in the other direction, with the lower wire, when the weighing mechanism is actuated, an impositive connection is formed between the two wires by a coil spring, thus permitting the upper wire and its pointer to be held close to the zero position by a suitable coin-controlled detent acting on the upper wire.

Referring more particularly to the drawings, the invention is embodied in a scale having a box-like base 10 (Figs. 1 and 2) with a vertically movable platform 11 at one end thereof and a hollow column 12 upstanding from the other end, which carries on its upper extremity a horizontal glass covered dial 13.

The weighing mechanism is preferably of well known construction of the general type disclosed in my prior Patent No. 1,638,260, issued August 9, 1927, and, as shown herein, this weighing mechanism is actuated by vertical stems 15 which support the platform 11 and act in conjunction with pivoted levers 16 extending into the base 10. Actuation of the weighing mechanism (not shown) by movement of the platform 11 serves to move correspondingly a horizontal rod 17, through which the indicating means is operated. As shown in Figs. 1 and 2, the rod 17 extends rearwardly within the base 10 and transmits movement to a pivoted, horizontal lever 18 and internal gear segment 19 carried thereby. The segment 19 meshes with a gear 20 fixed on a rotatably mounted, vertical shaft 21 which is in turn supported on a suitable thrust bearing formed in a bracket 22 mounted within the base. Thus the vertical shaft 21 is rotated in an amount proportional to the weight on the platform 11 and this movement is indicated on the dial 13 by means of a pointer 23 (Fig. 2).

Between the shaft 21 and the pointer 23 means is provided for moving the pointer in a clock-wise direction away from its zero position under the control of a coin-operated control device designated generally as 24. This means is preferably of such a nature that the size and weight of the parts may be maintained at a minimum whereby to reduce friction in the scale, and as herein shown it includes a lower vertical wire 25 connected to and supported by the shaft 21 (Fig. 1) and extending upwardly through the column 12. The wire 25 is journaled near its upper end in a horizontal wall 26 (Figs. 3 and 4) extending across the column a short distance below the dial.

For operatively connecting the pointer 23 to the lower wire 25 for corresponding actuation under the control of the coin-operated device 24, the pointer 23 is preferably formed integrally with an upper wire 27 which extends downwardly through the dial coaxially with the lower wire 25, and is rotatably supported in a channel-shaped bracket 28 secured to the lower side of the dial and extending from front to rear thereof as shown in Figs. 3, 4, and 5. A collar 29 (Figs. 3 and 4) fixed on the wire 27 within the bracket 28 holds the wire in the proper vertical position.

Between the bracket 28 and the transverse wall 26 the operating connection between the two wires 25 and 27 is formed, and in its preferred form this connection is positive in its action in one direction whereby the lower wire 25 moves the pointer 23 positively to its zero position when the weighing mechanism moves to its normal position after a weighing operation. This connection is best shown in Figs. 3 to 8 and comprises a pair of laterally projecting arms 30 and 31 formed respectively on the lower and upper wires by bending the ends thereof, the upper arm 31 being of L-shaped form to provide a vertical portion 32 whereby the two arms will contact each other when the two wires are rotated relatively to each other. When the weighing mechanism returns to its normal position after actuation, it rotates the wire 25 in a counter-clockwise direction and it will be seen that the arm 30 will act positively to return the upper arm 31 to a position wherein the pointer 23 indicates zero on the dial (Fig. 5).

To rotate the upper wire 27 with the lower wire in the other direction, yielding means is provided which acts on the upper wire and tends to rotate it in a clockwise direction and to hold the arm 31 in contact with the arm 30. This means preferably comprises a coil spring 33 acting between the two wires 25 and 27 so that the initial tension on the spring may be small and will be increased by rotation of the lower wire 25 relatively to the upper wire. For simplicity in mounting the spring 33, a pair of collars 35 (Figs. 6 to 8) are fixed one on each of the wires 25 and 27, each collar having a diametrically extending slot 36 at one end thereof so that the slotted ends may extend toward each other beyond the arms 30 and 31 with the arms projecting laterally through one end of each slot 36. Thus, each collar 35 is held against rotation with respect to the wire upon which it is mounted, and the opposite ends of the spring 33 may surround and be supported by the slotted ends of the collars 35. Transversely bent ends 37 (Fig. 8) formed on the spring 33 are engaged with the slots 36 of the collars to hold the collars and the adjacent ends of the springs against relative rotation.

When a person steps upon the platform 11, and actuates wire 25 and its arm 30, the pointer 23 is held adjacent to its zero position by a detent 40 arranged normally to lie in the path of movement of the arm 31 (Figs. 3, 5, and 6) and movable to an inoperative position (Fig. 4) by operation of the coin-receiving device 24. The detent 40 is hook-like in form and comprises a lever made from sheet metal to provide a channel-shaped section 41 (Figs. 3, 4, and 5) at one end to embrace the bracket 28, to which it is pivoted intermediate its ends by a pin 42. The hooked end of the detent 40 is normally pressed downwardly into the path of the arm 30 by spring 43 mounted on the bracket 28, and it is provided with a cam surface 44 arranged to be engaged by the arm 30 as it moves in a counter-clockwise direction (Fig. 5) to raise the detent 40 and permit movement of the arm 30 back to its normal position.

To raise the detent 40 when the coin is inserted in the control device 24, a lever 45 is pivoted intermediate its ends on the bracket 28 (Figs. 3, 4, and 5), and one end of the lever 45 overlies the bottom wall of the channel section 41 of the detent 40. Thus, when the other or outer end 46 of the lever 45 is raised, the detent 40 will be shifted to its inoperative position as shown in Fig. 4 of the drawings. When this is done the arm 30 is released and the pointer 23 is moved in a clockwise direction until the arm 30 has moved into abutment with the arm 31.

The coin-operated control device 24 is preferably of such a nature that it may be formed principally from simple sheet metal stampings and, as shown in Figs. 3, 4, 9, and 10, it comprises an outer plate 50, adapted to be detachably secured in spaced relation to an inner plate 51 carried by, and projecting downwardly from a horizontal plate 52 secured to the lower side of the dial 13 between the dial and the bracket 28. By this construction the bracket 28 serves to strengthen the plate 51. At one end the plate 50 has an upward extension 53 which is reversely bent, as shown in Figs. 3 and 4, so as to form a closing housing which projects upwardly to the level of the top of the dial 13. At the upper edge of the extension 53, a coin-receiving aperture 54 is formed through which a coin may be dropped into a passage formed between the plates 50 and 51 by a plurality of flat stampings 55, 56 and 57. The passage formed by the stampings has an angularly extending portion 58 at the lower end of which a coin 59 comes to rest upon the upper edge of a slidable plate 60 which may be moved horizontally in the space between the stampings 56 and 57. The sliding plate 60 is normally maintained in the position shown in Figs. 9 and 10 by a spring 61 acting on a plunger 62 mounted in a horizontal housing 63 secured on the outer side of the plate 50, the plunger being secured to the slide 60 by pins 64 extending through a slot 64ᵃ in the plate 50.

When the plunger 62 is moved to the left in Fig. 9, the plate 60 is moved away from the lower end of the passage 58 so that the coin 59 may drop into the horizontal space normally occupied by the slide 60. Upon release of the plunger 62, the plate 60 is drawn back toward the right and the coin is moved by the plate to the position shown in Fig. 10. In such movement the lower edge of the coin rides along the upper edge of the stamping 57 and its upper edge is brought into contact with the end 46 of the lever 45 which projects through the plate 51 and into the passage occupied by the slide 60. This contact of the coin 59 with the sloping edge of the lever 45 raises the end 46 of the lever 45 and consequently raises the detent 40 to the inoperative position shown in Fig. 4 of the drawings.

Continued movement of the slide from the position shown in Fig. 10 to the position shown in Fig. 9 moves the coin beyond the end of the stamping 57 and permits it to fall downwardly through a passage 65 and into a sloping chute 66. The chute 66 is provided with side walls 67 which extend upwardly along opposite sides of the bracket 28 in spaced relation thereto, whereby to completely inclose the lever 45 and the detent 40. The side walls 67 are attached at their edges to the plates 51 and 52 and to the adjacent side of the column 12, and the sloping bottom wall of the chute 66 extends through an aperture 68 Fig. 3 formed in the side of the column so that coins discharged from the passage 65 will be conducted into the column 12.

Such coins fall downwardly within the column onto a bottom wall 69 (Fig. 1) which extends across the column near the bottom thereof, and between the wall 69 and the wall 26, the wire 25 is protected by means of a tube 70 surrounding the wire and supported by the two transverse walls. The coins thus deposited in the column may be removed through an opening near the bottom of the column, which opening is closed by a detachable plate 71 (Fig. 1).

Prior to the actuation of the platform 11 the parts of the mechanism are in the position shown in Figs. 3, 5, and 6, and the pointer 23 is in its zero position. When a weight is placed on the platform a shaft 21 is rotated and this produces corresponding rotation of the wire 25 and its projecting arm 30 so that the arm assumes a position similar to that shown in Fig. 7. This releases the arm 31 from the control of the arm 30 and the arm 31 is moved by the spring 33 until any lost motion between the arm 31 and the detent 40 is taken up and the arm 31 and the pointer 23 assume substantially the positions shown in Fig. 7.

It will be noted that in the rotation of the wire 25, additional force is built up in the spring 33, tending to move the arm 31 in a clockwise direction and into contact with the arm 30.

A coin is then dropped into the slot 54 and it comes to rest upon the top of the slide 60 as shown in Fig. 9. Upon movement of the plunger 62 to the left the coin 59 drops down in front of the slide which is then returned to the right by the spring 61. This moves the coin to the position shown in Fig. 10 so as to cam the end 46 of the lever 45 upwardly to the position shown in Fig. 4. Since the lever 45 is operatively connected to the detent 40 it will be seen that the detent will be raised to the position shown in Fig. 4 and the arm 31 will be released so that it may be moved by the spring 33 to the position determined by the arm 30. This moves the pointer to a position wherein it indicates the amount of weight upon the platform 11.

The coin 59 after passing the lever 45 is dropped through the passage 65 and through the chute 66 into the coin receiving chamber provided by the column 12.

Thus, the detent 40 will be returned at once to its lowered or operative position by the action of the spring 43 and upon removal of the weight from the platform 11 the movement of the arm 30 in counter-clockwise direction will move the arm 31 positively into contact with the cam face 44 of the detent. This raises the detent and permits the arm 31 to move back to its initial position as shown in Figs. 5 and 6.

From the foregoing it will be apparent that the invention provides a coin-controlled scale which is simple in construction and which will function accurately over long periods of time. It will also be seen that the connection provided between the weighing mechanism and the indicating pointer is of particular advantage in connection with scales having horizontal dials since the parts of the connection are simple in form and are easily assembled.

It will also be seen that the coin-control device is advantageous in its construction since it is composed of a plurality of simple sheet metal stampings assembled in a simple manner.

I claim as my invention:

1. A coin-controlled scale comprising weighing mechanism, a first rod operatively connected to and rotated by said mechanism, the end of said rod being bent to form a first laterally projecting arm, a diametrically slotted collar fixed in surrounding relation to said rod with said arm projecting out of one end of the slot, a second rod rotatably mounted in fixed longitudinal position coaxially with respect to said first rod and having one end bent to provide a second laterally projecting arm arranged in the rotation of said second rod to abut said first arm, a transversely slotted collar on said second rod with the second arm extending out of one end of the slot, a coiled spring having its opposite ends surrounding and supported by the slotted ends of said collars, said spring having transverse parts at its ends engaging said slots and acting to rotate said second arm into engagement with said first arm, a movable detent normally positioned in the path of said second arm to prevent movement thereof with said first arm, means operable by a coin to move said detent to an inoperative position, and a pointer attached to said second rod for movement thereby.

2. A coin-controlled scale comprising a base with weighing mechanism therein, a hollow column upstanding therefrom, a substantially horizontal dial carried by said column, a member extending upwardly through said column and movable by said mechanism, a pointer movable across said dial from a zero position to a position determined by said member, said member being movable in one direction while said pointer remains at zero position, means for moving said pointer to the position determined by said member, a coin-actuated device carried by said dial and having a coin-receiving aperture positioned at one edge of said dial, a detent within said column for restraining said pointer against movement with said member, motion transmitting means operable by a coin in said device and extending beneath said dial from said device to said detent for moving the detent, and means enclosing said motion transmitting means and providing a coin-conducting chute from said device into said column.

3. A scale comprising a base with a platform thereon, a hollow column upstanding from the base, a horizontal dial carried on said column, weighing mechanism operated by said platform, a vertically extending member in said column arranged to be rotated by said mechanism, a second rotatable vertical member mounted coaxially with said first member in fixed longitudinal position and extending through the dial, a pointer carried by the second member over said dial, means forming abutments eccentrically positioned on said members whereby said first member may be rotated by said mechanism while said second member and the pointer remain stationary, a spring tending to move the second member with the first member, a detent within the column normally restraining said second member against such movement, means extending from the detent beneath the dial and to the edge thereof operable to release the detent, and a coin-actuated device at the edge of the dial operable by means of a coin to actuate said detent-releasing means.

4. A coin-controlled scale having a hollow column, a substantially horizontal dial supported on the top of the column, a plate secured to the bottom of the dial between and extending beyond one edge thereof, a coin-control device carried by the extending end of the plate, a channel-shaped bracket extending diametrically beneath and secured to said dial and acting as a brace for said plate, a member extending vertically through said dial and said bracket and rotatably journaled therein, a collar on said member within the bracket to prevent downward movement of the member, a pointer carried by said member, weighing mechanism, a shaft within the column rotatable by said mechanism and operable to determine the extent of movement of said member, a spring for moving said member with the shaft, a detent carried by said bracket operable to releasably hold said member against movement by the spring, and means operatively connecting the detent to the coin-control device.

5. In a coin-controlled scale the combination of weighing mechanism, a member rotatable by said mechanism, means forming an abutment positioned eccentrically of said member, a rod rotatably mounted concentric with said member, said rod being bent at the end adjacent to said member to form an L-shaped arm extending laterally from the rotative axis of the wire, and then parallel to said axis, a coil spring positioned concentrically with respect to said axis and connected to said member and to said rod, said spring acting to rotate said arm into contact with said abutment, and a pointer actuated by rotation of said rod.

6. A coin-operated control device comprising a pair of spaced plates, means between the plates defining a passage having a first portion, a slide movable in said first portion of the passage, a spring maintaining said slide in a position near one end of said portion, said passage also having a second downwardly sloping portion opening downwardly into said first portion at an angle thereto at a point in said first portion normally occupied by said slide, means for moving said slide beyond the end of said second portion to permit a coin to drop from said second portion of the passage into said first portion, and a member extending into said first portion of the passage just beyond the end of said slide in its normal position and beneath said second portion and adapted to be actuated by a coin moved through the passage when the slide is returned to its normal position by the spring.

7. A scale comprising a hollow column, a substantially horizontal dial supported on the top of the column and projecting beyond one edge thereof, a coin-actuated control device mounted at the edge of the dial, an elongated beam-like supporting bracket extending substantially diametrically beneath said dial and toward said edge thereof and acting as a brace for supporting said device, a rotatable member extending through said dial, a pointer carried by said member, weighing mechanism, an element within the column actuated by said mechanism and operable to determine the extent of movement of said member, means for moving said member with the element, a detent mounted on said bracket for releasably holding said member against movement with said element, and motion-transmitting means carried by said bracket operatively connecting said detent and said coin-control device.

8. A scale comprising a hollow column, a substantially horizontal dial supported on the top of the column and projecting beyond one edge thereof, a coin-actuated control device mounted at the edge of the dial, an elongated beam-like supporting bracket extending substantially diametrically beneath said dial and toward said edge thereof and acting as a brace for supporting said device, a rotatable member extending through said dial, a pointer carried by said member, weighing mechanism, an element within the column actuated by said mechanism and operable to determine the extent of movement of said member, means operable to move said member in accordance with the element, a detent mounted on said bracket for releasably holding said member against movement with said element, motion-transmitting means carried by said bracket operatively connecting said detent to said coin-actuated device for releasing said detent, and means surrounding and protecting said motion-transmitting means and said detent and forming a chute for conveying coins from said device into said column.

9. In a coin-controlled scale, the combination of a weighing mechanism, a rod rotatable by said mechanism, a second rotatable rod concentrically mounted with respect to said first mentioned rod, both of said rods at their adjacent ends being bent to form laterally projecting arms and one of said arms being bent so as to engage the other of said arms in relative rotation of said rods, a pair of diametrically slotted collars one fixed in surrounding relation to each of said rods with the arms of said rods projecting out of one end of said slots, a coiled spring having its opposite ends surrounding and supported by the slotted ends of said collars, said spring having transverse parts at its ends engaging said slots and acting to rotate said rods relatively to each other to maintain said arms in engagement, a movable detent normally positioned in the path of the arm on said second rod, and means operable by a coin to move said detent to an inoperative position.

In testimony whereof, I have hereunto affixed my signature.

MARIUS H. HANSEN.